United States Patent [19]

Harada

[11] 4,392,082
[45] Jul. 5, 1983

[54] PRESSURE-SENSITIVE IGNITION PLUG
[75] Inventor: Koji Harada, Hitachi, Japan
[73] Assignee: Hitachi, Ltd., Tokyo, Japan
[21] Appl. No.: 290,108
[22] Filed: Aug. 5, 1981
[30] Foreign Application Priority Data
  Aug. 15, 1980 [JP] Japan .................................. 55-111665
  Aug. 22, 1980 [JP] Japan .................................. 55-116064
[51] Int. Cl.³ ............................................ H01T 13/00
[52] U.S. Cl. ........................................ 315/55; 315/58;
                                                              313/118
[58] Field of Search ...................... 315/55, 58; 313/118,
                                      313/126, 132, 135, 141; 123/425

[56] References Cited
U.S. PATENT DOCUMENTS
  3,020,763  2/1962  Davis ........................................ 73/714
  4,114,068  9/1978  Tylka ................................... 313/126 X Primary Examiner—Eugene La Roche
Assistant Examiner—Vincent DeLuca
Attorney, Agent, or Firm—Antonelli, Terry & Wands

[57] ABSTRACT

A pressure-sensitive ignition plug capable of sensing the internal pressure of a cylinder of an internal combustion engine and transmitting accommodated signal corresponding to the internal pressure. The pressure-sensitive ignition plug has a pressure-sensitive unit having an annular form and mounted in an annular space formed between an insulator assembly embracing a central electrode and a metallic plug body which supports the insulator assembly. The pressure sensing unit has an upwardly projected signal terminal through which an amplifier unit for amplifying the signal from the pressure sensing unit is detachably connected to the latter. The amplifier unit is embedded in a rubber sheath covering the upper half part of the ignition plug or, alternatively, formed in an annular shape and accommodated by a metallic case having a central through bore, the metallic case being adapted to make a snap fit to a hexagonal portion of the plug body from the upper side of the latter.

6 Claims, 5 Drawing Figures

PRESSURE-SENSITIVE IGNITION PLUG

BACKGROUND OF THE INVENTION

The present invention relates to a pressure-sensitive ignition plug for use in internal combustion engine for automobiles and, more particularly, to an improvement in the pressure sensing unit and signal transmission system of a pressure sensitive ignition plug.

It is a current tendency to use ignition plugs having a pressure sensing unit sensitive to the internal pressure of the cylinder of engine, in order to control the knocking taking place in the engine. This type of ignition plug is generally referred to as "pressure-sensitive ignition plug." The use of the pressure-sensitive ignition plug is advantageous in that it can eliminate the necessity for a specific bore for detecting the internal pressure other than the bore for fitting the ignition plug.

The pressure sensing unit usually incorporates a piezoelectric element. An example of the pressure-sensitive ignition plug using a pressure sensitive unit incorporating a piezoelectric element is disclosed in the specification of the U.S. Pat. No. 3,020,763. The piezoelectric element exhibits a high output voltage of an order of several volts when the circuit connected to the output terminals thereof is opened. However, since the piezoelectric element has an extremely high impedance, the level of the output signal from the piezoelectric element is largely reduced due to connection of load including lead lines, and noises are introduced into the signal line to make it difficult to discriminate the output signal.

In order to obviate this problem of the prior art, it has been proposed to use a strain gauge or a variable capacitance type element in the pressure sensing unit, in place of the piezoelectric element. These elements, however, can provide only weak output signals, so that it is quite difficult to distinctively and sufficiently amplify only the output signal particularly in the area around the cylinder where the level of the noise is specifically high. Namely, it is difficult to obtain a high S/N ratio with these pressure-sensitive elements.

SUMMARY OF THE INVENTION

Accordingly, an object of the invention is to provide a pressure-sensitive ignition plug which can provide a pressure signal with reduced level of electric noise and which facilitates the mounting and demounting on and from the engine, as well as assembling.

To these ends, according to one aspect of the invention, there is provided a pressure-sensitive ignition plug comprising an insulator assembly accomodating a central electrode to which electric current of a high voltage is applied, a metallic plug body concentrically supporting the insulator assembly and provided with a threaded portion at which the plug body is mounted on an engine, the plug body having a grounded electrode opposing to the central electrode to form therebetween a sparking gap, and a pressure sensing unit incorporated in the plug body and adapted to sense the internal pressure of a cylinder of the engine, wherein the pressure sensing unit has an annular form and is disposed in an annular gap formed between the insulator assembly and the plug body in such a manner as to be able to detect a change in the internal pressure of the cylinder through the displacement of the insulator assembly, the pressure sensing unit having an upwardly projecting signal terminal for transmitting the sensing output, and an amplifier unit for amplifying the sensing output is detachably connected to the pressure sensing unit through the signal terminal.

According to another aspect of the invention, there is provided a pressure-sensitive ignition plug of the type mentioned above, characterized by further comprising a high voltage cord for supplying electric current of high voltage from an ignition voltage source to the central electrode, and a rubber sheath unitarily covering the high voltage cord, insulator assembly and a hexagonal portion formed at an upper portion of the plug body, wherein the amplifier unit having a junction for connection to the signal terminal is embedded in the rubber sheath.

According to still another aspect of the invention, there is provided a pressure-sensitive ignition plug of the first mentioned type, wherein the amplifier unit has an annular form and accomodated by a metallic casing having a central through bore and provided with holes to pass the lead lines for supplying electric power to the internal amplifier unit and holes to pass the lead lines for output signal, the amplifier unit having a connector for connection to the signal terminal of the pressure sensitive unit, and wherein the insulator assembly is received at its head portion by the through bore of the metallic casing while the metallic casing is mounted in the metallic plug body so as to be grounded through the metallic plug body.

By way of example only, certain illustrative embodiments of the invention will now be described with reference to the accompanying drawings.

DESCRIPTION OF THE PREFERRED EMBODIMENTS

Figure 1:
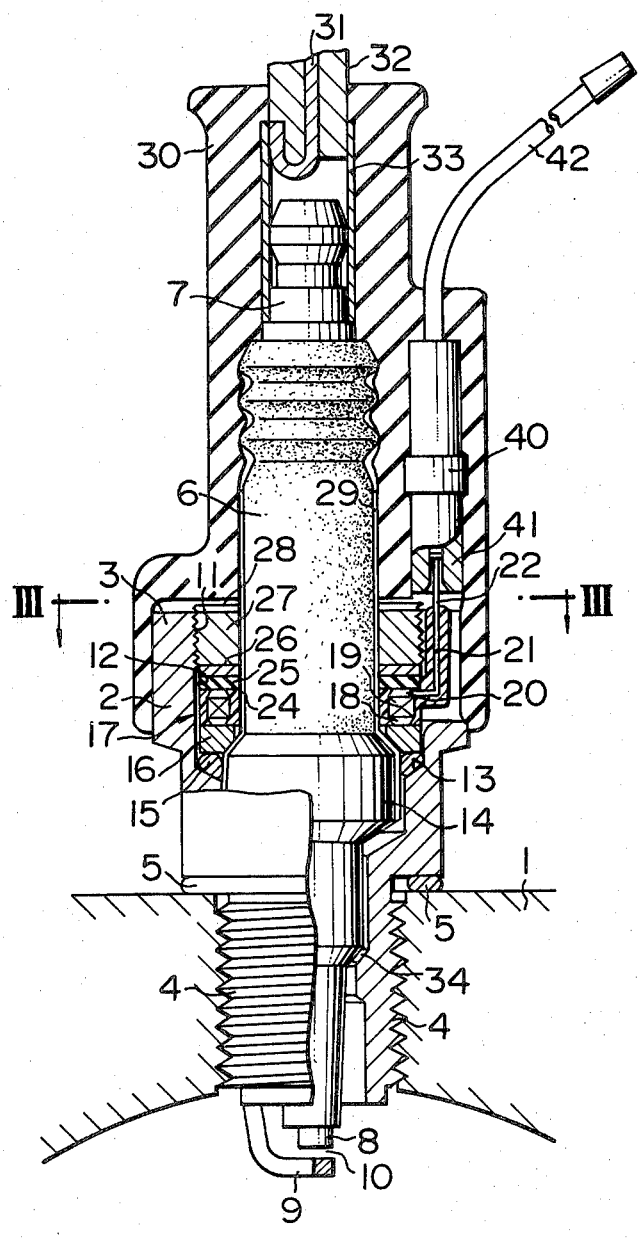
FIG. 1 is a sectional view of an essential part of a pressure-sensitive ignition plug in accordance with an embodiment of the invention.

Referring first to FIG. 1 which is a sectional view of an essential part of a pressure-sensitive ignition plug constructed in accordance with an embodiment of the invention, the ignition plug has a metallic plug body 2 having an external thread at which it is screwed into a threaded bore formed in a cylinder head 1 and fixed to the latter in a gas-tight manner through a gasket 5 interposed therebetween. The metallic plug body 2 has a hexagonal upper portion 3. As will be clearly seen from the drawings, the plug body 2 is made hollow to concentrically support therein an insulator assembly 6 which in turn embraces a central electrode adapted to be applied with a high voltage. The central electrode designated at a reference numeral 8 has a high voltage terminal 7. A grounded electrode 9 projects downwardly from the lower end of the plug body 2 to the lower side of the central electrode to form therebetween a sparking gap 10. A cylindrical bore 12 provided at its upper part with a female thread 11 is formed in the plug body 2 at a portion of the latter where the hexagonal portion 3 is formed, so that an annular space is formed between the outer surface of the insulator assembly 6 and the inner peripheral surface of the hexagonal portion 3 of the plug body 2. A fixing ring 15 is put between a tapered surface 13 of the plug body 2 constituting the bottom of the above-mentioned annular space and the maximum-diameter portion 14 of the insulator assembly 6. A pressure receiving ring 16, pressure sensing unit 17, insulating washer 25 and a slip ring 26 are stacked in layers in the mentioned order from the bottom on the fixing ring 15. These members are firmly pressed by a fixing screw 27 which engages with the female screw 11 of the plug body 2. As will be seen from FIG. 3, the fixing screw 27 is provided in its upper surface with grooves 28 for retaining a plug wrench or the like tool for tightening the fixing screw 27.

Figure 2:
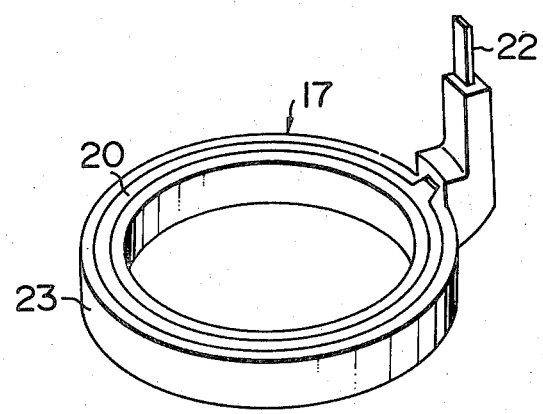
FIG. 2 is a perspective view of a pressure sensing unit of the pressure-sensitive ignition plug as shown in FIG. 1.

Referring back to FIG. 1 and also to FIG. 2, the pressure sensing unit 17 has an integral construction including an annular lower electrode 18, piezoelectric element 19 and an upper electrode 20 stacked in layers and molded with insulating resin 23. The upper electrode 20 is provided at its right side portion as viewed in FIG. 1 with a branch 21 which is bent upwardly and wrapped by the resin 23 to exhibit an appearance as shown in FIG. 2. The upper end of the branch 21 is exposed to the outside of the resin 23 to form a signal terminal for connection. The branch 21 is placed in a groove 3' (See FIG. 3) formed in the hexagonal portion.

Figure 3:
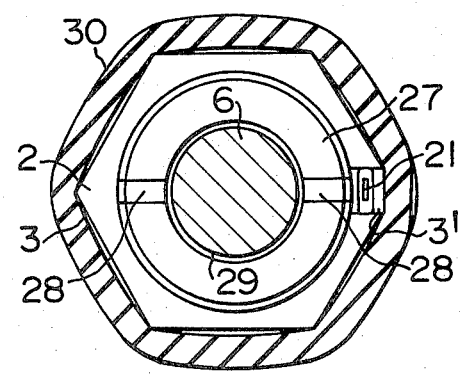
FIG. 3 is a sectional view taken along the line III—III of FIG. 1.

As will be seen from FIGS. 1 and 3, a rubber sheath 30 is provided to unitarily cover the high voltage cord 32 connected to the high voltage terminal of the central electrode, insulator assembly 6 and down to the hexagonal portion 3 of the plug body 2. An amplifier unit 40 for amplifying the signal from the pressure sensing unit is embedded in this rubber sheath 30. The signal terminal 22 of the pressure sensing unit is inserted into the metallic case of the junction 41 of the amplifier unit 40, so that the sensing signal is transmitted to a control unit (not shown) through the amplifier unit 40 and lead lines 42. A metallic sleeve 33 fits around the high voltage terminal 7 of the insulator assembly so that the electric current of high voltage is applied to the terminal 7 through a resistance cord 31 which is embedded in an insulating resin at the core of the high voltage cord 32. The high voltage cord 32 makes a close contact with the rubber sheath 30 which covers integrally the insulator assembly 6 and the hexagonal portion 3 of the plug body 2 to prevent moisture and dusts from coming into the unit 17.

The internal structure of the insulator assembly 6 is not shown in detail because it is materially identical to that of known ignition plug. It is to be noted, however, that the insulator assembly 6 is provided with an external conductive coating 29 so that the external surface of the insulator assembly 6 and the plug body 2 are grounded through the cylinder head 1. In FIG. 1, a reference numeral 34 designates a packing washer.

In operation, as the engine is started, electric current of a high voltage from the ignition high voltage source is applied to the high voltage terminal 7 through the resistance cord 31 of the high voltage cord 32. In consequence, a sparking takes place across the sparking gap 10 to ignite the air-fuel mixture which has been introduced into the cylinder connected to the cylinder head 1. As a result of the combustion in the cylinder, the internal pressure of the cylinder is increased so that the portion of the insulator assembly 6 exposed to the combustion chamber in the cylinder is slightly moved in the axial direction by the increased pressure to press the piezoelectric element 19 of the pressure sensing unit 17 through the pressure receiving ring 16. The signal voltage produced by the piezoelectric element 18 is amplified by the amplifier unit 40 and is transmitted through the lead line 42 to the control unit. This control unit may be an ignition timing controller as shown, for example, in the specification of the U.S. Pat. No. 4,002,155, adapted to optimize the advance angle of ignition timing to obtain maximum output power without suffering disadvantageous knocking of the engine.

The pressure-sensitive ignition plug of the described embodiment is mounted on the engine in the following procedure. First of all, the plug body incorporating the pressure-sensitive unit is screwed into the threaded bore of the cylinder head by means of a tightening tool which is typically a plug wrench adapted to fit the hexagonal portion 3 of the plug body 2. Then, the rubber sheath 30 in which the amplifier unit is embedded is mounted to cover the insulator assembly 6 and the hexagonal portion 3 of the plug body in such a manner that the junction portion of the amplifier unit aligns and contact with the signal terminal of the pressure sensing unit.

The demounting of the ignition plug from the engine can be made in the reverse procedure, namely by removing the rubber sheath from the plug body and then unscrewing the plug body.

It will be seen that the pressure-sensitive ignition plug of the described embodiment can be attached and detached to and from the engine and can be assembled in quite an easy manner.

In addition, since the pressure sensing unit 17 is disposed in the plug body 2 while the amplifier unit 40 is embedded in the rubber sheath 30, the temperature rise of the amplifier unit 40 is suppressed and the oscillation of the lead line 42 is remarkably reduced to avoid accidents such as cutting of the line. Furthermore, the connection between the signal terminal 22 and the junction 41 of the metallic case can be accomplished without fail by a plug-in type connection.

As will be explained later, the amplifier unit 40 not only amplifies the signal voltage but facilitates the matching with the low impedance of the signal line and the control unit thanks to the lowered output impedance of the amplifier circuit. This conveniently serves to increase the S/N ratio regardless of the degradation of insulation resistance in the load circuit and incoming of noises, and ensures the correct operation over a long period of time.

Since the metallic sleeve 33 is fitted around the high-voltage terminal 7, the resistance cord 31 of the high voltage cord 32 can make electric contact with the metallic sleeve 33 without fail, as the cord 32 is inserted into the bore of the rubber sheath 30 with the end of the resistance cord 31 bent as illustrated. Thus, the connection between the high voltage cord and the insulator assembly 6 also can be accomplished easily without fail. The rubber sheath 30 covers the entire area of the exposed portion of the insulator assembly 6 and the plug body 2 to perfectly prevent moisture and dust from coming into the critical portion of the pressure-sensitive ignition plug, thereby to avoid troubles such as ignition failure attributable to the degradation of insulation.

Figure 4:
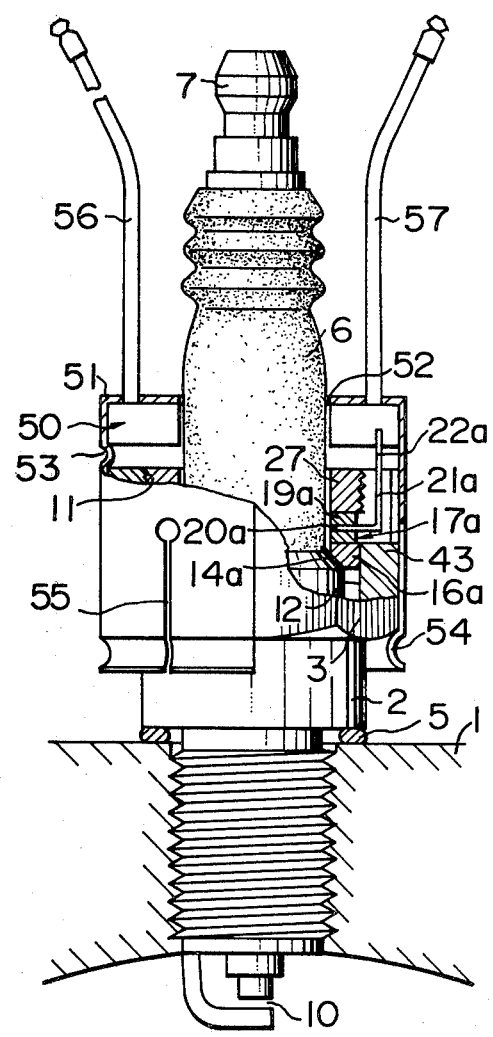
FIG. 4 is a sectional view of an essential part of a pressure-sensitive ignition plug in accordance with another embodiment of the invention.

FIG. 4 shows another embodiment of the invention. In this embodiment, the amplifier unit has an annular form and is accomodated by an annular metallic casing having a central through bore. This metallic case is mounted on the plug body incorporating the pressure sensing unit such that the head portion of the insulator assembly of the pressure-sensitive plug is received by the through bore of the plug body. In FIG. 4, the same reference numerals are used to denote the same parts or members as those of the first embodiment.

A pressure receiving ring 16a is interposed between the shoulder portion 14a of the maximum-diameter portion of the insulator assembly 6 and the wall of the cylindrical bore 12 formed in the hexagonal portion 3 of the plug body 2. A pressure sensing unit 17a is placed on the pressure receiving ring 16a and is pressed by a fixing screw 27 which engages with the female screw thread 11 formed at the upper end of the cylindrical bore. The pressure sensing unit 17a has a pair of annular piezoelectric elements 19a and an electrode 20a clamped therebetween. The right side portion of the electrode 20a as viewed in the drawings has a branch 21a which is bent upwardly therefrom. The upper end of the branch 21a constitutes a signal electrode 22a. Although not shown, the piezoelectric elements 19a and the branch 21a are insulated to prevent any leak of the electric current.

An annular amplifier unit 50 is accomodated by a metallic cover 51 which is provided with a central through bore 52 penetrated by the insulator assembly 6 and a recess 53 for fixing the amplifier unit 50 at a predetermined position. The metallic cover 51 is further provided with claws 54 adapted to fit the lower face of the hexagonal portion 3 and vertical slits 55 for facilitating the radial resilient deflection of the claws 54. In addition, a hole for passing a power lead line 56 and a hole for signal lines 57 are formed in the metallic cover 51. In assembling, the metallic cover 51 accomodating the amplifier unit 50 is inserted into the through bore 52 through the insulator assembly 6 and is pressed with the connector of the amplifier unit 50 aligned with the signal terminal 22a of the pressure sensing unit 17a. In consequence, the claws 54 at the lower end of the cover 51 are deflected radially outwardly as they abut the upper end of the hexagonal portion 3 and are then contracted as they slide beyond the lower end of the hexagonal portion 3, thereby to fix the cover 51 to the body of the pressure-sensitive plug.

The operation of this embodiment is not described here because it is materially identical to that of the first embodiment shown in FIGS. 1 to 3.

The pressure-sensitive ignition plug of this embodiment can be attached and detached to and from the engine and assembled easily as in the case of the ignition plug of the first embodiment. In addition, since the output impedance of the amplifier unit 50 can be lowered sufficiently, the latter can be connected to a control unit or a measuring unit directly to facilitate the connecting work. Furthermore, since the amplifier unit 50 can provide an output signal of a high level, it is possible to obtain correct operation of the unit connected to the pressure-sensitive plug for a long period of time, regardless of the deterioration of the insulation of lead lines due to absorption of moisture or the like reason.

Furthermore, since in this embodiment the amplifier unit 50 is covered by the metallic cover 51, the breakdown of the amplifier is avoided even in the case of an accidental leak of high voltage current from the high voltage terminal 7, because such a leaking current is grounded through the claws 54 of the cover 51 and then through the plug body 2.

Figure 5:
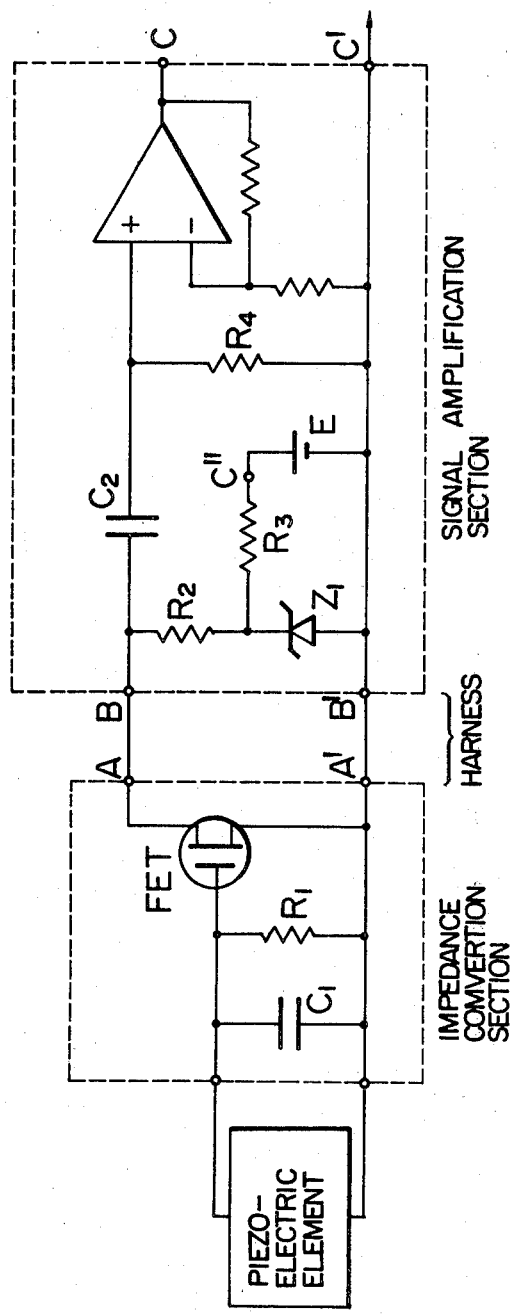
FIG. 5 is a circuit diagram of an amplifier unit.

FIG. 5 shows an example of the electric circuit incorporated in the amplifier unit suitable for use in the pressure-sensitive ignition plugs of the described two embodiments.

The electric charge Q produced by the piezoelectric element is accumulated in the electrostatic capacitance $C_1$ of an impedance converter section to induce a voltage which is represented by $V_o=Q/C$. Although the piezoelectric element exhibits a high impedance of 100 M$\Omega$, the signal voltage can be utilized efficiently because the input impedance of the FET (field effect transistor) is correspondingly high. A symbol $R_1$ represents a bias resistance which determined the operation point of the FET. The output voltage v of the FET is somewhat lower than the voltage $V_o$, but the influence of the noise picked up by a long harness is suppressed because the output impedance $R_i$ of the FET is as low as 100$\Omega$. For the same reason, the matching with the amplifier of the amplification section connected thereto is very much facilitated. Namely, the signal voltage $v_o$ supplied from the terminals A,A' of the impedance convertion section to the terminals B,B' of the signal amplification section is applied to a coupling capacitor $C_2$ which permits only the A.C. component of the signal voltage to pass therethrough. This A.C. component is then applied to both ends of a resistance $R_4$ as the input voltage $v_{in}$ to the amplifier. The capacitance of 1 $\mu$F of the capacitor $C_2$ is enough for picking up the knocking component which usually falls between 5 and 10 KHz. Since the capacitor $C_2$ in this case exhibits an impedance of about 170 $\Omega$ for a wave of 1 KHz, the sum of the output impedance $R_1$ (100 $\Omega$) of the FET and the impedance of the capacitor $C_2$ is as small as 270 $\Omega$ which is sufficiently small as compared with the input resistance $R_4$ (10 K$\Omega$) of the amplifier.

The rate of utilization of the signal voltage $V_o$, therefore, is calculated as follows:

$$10K/(10K+0.27K)=0.973$$

Thus, it is possible to utilize about 97% of the signal voltage $V_o$.

If the FET has a high output impedance $R_i$ of 1 M$\Omega$, the voltage vin inputted to the amplifier is decreased down to only 1% of the signal voltage $v_o$. More practically, the input voltage $v_{in}$ is 0.97 V when the signal voltage $v_o$ is 1 V, if the output impedance $R_i$ is 100 $\Omega$, while, if the impedance $R_i$ is 1 M$\Omega$, the input voltage $v_{in}$ to the amplifier takes an extremely low level of 10 mV. Assuming here that the noise voltage picked up by the harness is 10 mV, the S/N ratio is calculated to be 100 and 1, respectively, when the output impedance $R_i$ from the FET is 100 $\Omega$ and 1 M$\Omega$. In the latter case, it is almost impossible to discriminate the signal from the noise.

A symbol E represents the terminal voltage of the battery. The voltage is usually about 13 V during the operation of the engine. A Zener diode $Z_1$ is adapted to supply a D.C. current through a resistance $R_3$ to feed electric power of a constant voltage of about 10 V.

When this circuit is applied to the amplifier unit 40 of the first embodiment shown in FIG. 1, it is preferred to mount only the impedance conversion section of this circuit in the amplifier unit 40. Such an arrangement offers the following advantages.

(1) It is possible to remarkably reduce the size of the amplifier unit.

(2) Since it is possible to use a line commonly for the transmission of signal and the power supply, only one harness is necessitated to simplify the construction.

(3) It is possible to make the control unit incorporate the amplification section of this circuit.

In contrast, in the case where the signal amplification section is also included by the amplifier unit 40, the harness has to have three junctions C,C' and C''. Therefore, it is necessary to use an additional harness for the power supply as the power lead line 56 in the amplifier unit 50 of the second embodiment which incorporates both of the impedance conversion section and the signal amplification section, or to use a harness of three-core wire type.

Finally, it is to be noted that the following advantages are commonly brought about by the described first and second embodiments, in addition to the advantageous effects described heretofore.

(1) The piezoelectric elements incorporated in the described embodiments have spreading use because of advantageous features such as simple construction, high mechanical strength and low cost. However, the piezoelectric elements generally have such a drawback that, because of the high impedance, the level of the output signal is largely lowered when connected to a load having a low impedance, as stated before. From this point of view, it is desirable to reduce the length of the output lead line as much as possible because the output lead line itself constitutes a load because of its inductance, reactance and the leak resistance and the impedance of the lead line is generally increased as the length of the lead line is increased, resulting in the lowered level of the signal output to undesirably permit the pick up of the external noise by induction. This problem is overcome in the first and the second embodiment in which the short terminals 22,22a of the pressure sensing units are directly connected to the amplifier units 40,50 to minimize the reduction of the signal level and pick up of the noise by induction between these two units.

(2) In the pressure-sensitive ignition plugs of the first and the second embodiments, when the main part of the ignition plug such as the insulator assembly and the plug body have been worn out during a long use, it is possible to renew only the main part while subjecting the pressure sensing unit and the amplifier unit for further use, to economically lower the service cost.

What is claimed is:

1. A pressure-sensitive ignition plug comprising an insulator assembly accommodating a central electrode to which electric current of a high voltage is applied, a metallic plug body concentrically supporting said insulator assembly and provided with a threaded portion at which said plug body is mounted on an engine, said plug body having a grounded electrode opposing to said central electrode to form therebetween a sparking gap, and a pressure sensing unit incorporated in said plug body and adapted to sense the internal pressure of a cylinder of said engine, wherein said pressure sensing unit has an annular form and is disposed in an annular gap formed between said insulator assembly and said plug body in such a manner as to be able to detect a change in the internal pressure of said cylinder through the displacement of said insulator assembly, said pressure sensing unit having an upwardly projecting signal terminal for transmitting the sensing output, and an amplifier unit for amplifying the sensing output is detachably connected to said pressure sensing unit through said signal terminal.

2. A pressure-sensitive ignition plug as claimed in claim 1, characterized by further comprising a high voltage cord for supplying electric current of high voltage from an ignition voltage source to said central electrode, and a rubber sheath unitarily covering said high voltage cord, insulator assembly and a hexagonal portion formed at an upper portion of said plug body, wherein said amplifier unit having a junction for connection to said signal terminal is embedded in said rubber sheath.

3. A pressure-sensitive ignition plug as claimed in claim 1, wherein said amplifier unit has an annular form and accommodated by a metallic casing having a central through bore and provided with holes to pass the lead lines for supplying electric power to the internal amplifier unit and holes to pass the lead lines for output signal, said amplifier unit having a connector for connection to said signal terminal of said pressure sensitive unit, and wherein said insulator assembly is received at its head portion by said through bore of the metallic casing while said metallic casing is mounted in said metallic plug body so as to be grounded through the metallic plug body.

4. A pressure-sensitive ignition plug as claimed in any one of claims 1, 2 and 3, wherein said pressure sensing unit has at least one annular electrode and at least one annular piezoelectric element, one of said electrodes is provided with a branch extending therefrom radially outwardly and then bent upwardly, said electrode and said piezoelectric element being moulded integrally with an insulating resin, the end of said branch being exposed to the outside of said insulating resin constituting said signal terminal.

5. A pressure-sensitive ignition plug as claimed in any one of claims 1, 2 and 3, wherein the electric circuit of said amplifier unit includes an impedance conversion section and a signal amplification section.

6. A pressure-sensitive ignition plug as claimed in claim 2, wherein said amplifier unit includes an impedance section while a signal amplification section which constitute, in combination with said impedance conversion section, an electric circuit for amplification, is included by a control unit to be connected to said amplifier unit, thereby to permit the reduction of size of said amplifier unit.

* * * * *